United States Patent [19]
van den Brandt

[11] Patent Number: 5,601,351
[45] Date of Patent: Feb. 11, 1997

[54] HIGH-EFFICIENCY ILLUMINATION DEVICE AND IMAGE PROJECTION APPARATUS COMPRISING SUCH A DEVICE

[75] Inventor: Adrianus H. J. van den Brandt, Eindhoven, Netherlands

[73] Assignee: U.S. Philips Corporation, New York, N.Y.

[21] Appl. No.: 457,944

[22] Filed: Jun. 1, 1995

[30] Foreign Application Priority Data

Jun. 1, 1994 [EP] European Pat. Off. .............. 94201560

[51] Int. Cl.⁶ ...................................................... G03B 21/14
[52] U.S. Cl. .................................................. 353/20; 353/38
[58] Field of Search .................................... 353/20, 38, 37, 353/34, 33, 31; 359/483, 494, 495, 496

[56] References Cited

U.S. PATENT DOCUMENTS

| | | | |
|---|---|---|---|
| 4,127,322 | 11/1978 | Jacobson et al. ..................... | 353/31 |
| 4,995,702 | 2/1991 | Aruga . | |
| 5,115,305 | 5/1992 | Baur et al. ............................ | 359/40 |
| 5,153,752 | 10/1992 | Kurematsu et al. ................... | 359/40 |
| 5,172,254 | 12/1992 | Atarashi ................................ | 359/40 |
| 5,184,248 | 2/1993 | de Vaan et al. ....................... | 359/496 |
| 5,278,680 | 1/1994 | Karasawa et al. ..................... | 359/40 |
| 5,381,278 | 1/1995 | Shingaki et al. ...................... | 353/20 |
| 5,387,953 | 2/1995 | Minoura et al. ...................... | 353/20 |
| 5,446,510 | 8/1995 | Mitsutake et al. .................... | 359/40 |
| 5,461,500 | 10/1995 | Tsuji et al. ............................ | 359/48 |

OTHER PUBLICATIONS

"A Full-Color TFT-LCD With A Polymer-Dispersed Structure", by Yoshida et al, Japan Display '92, pp. 631-634.

*Primary Examiner*—William Dowling
*Attorney, Agent, or Firm*—Michael E. Marion

[57] ABSTRACT

An illumination device for supplying a beam of linearly polarized light having a non-rotationally symmetrical cross-section at the location of an object to be illuminated is described, which device comprises a light source, a reflector, an optical integrator (54, 82) for forming said beam cross-section and for realizing a uniform light distribution across the beam cross-section, and a polarizing system for converting the light supplied by the source into linearly polarized light. Since the polarizing system is arranged in the radiation path in front of the optical integrator, the device can be implemented with a small number of components and in a compact manner. The device may be used to great advantage in an image projection apparatus.

19 Claims, 5 Drawing Sheets

HIGH-EFFICIENCY ILLUMINATION DEVICE AND IMAGE PROJECTION APPARATUS COMPRISING SUCH A DEVICE

BACKGROUND OF THE INVENTION

1. Field of the Invention

The invention relates to an illumination device for supplying a beam of linearly polarized light having a non-rotationally symmetrical beam cross-section at the location of an object to be illuminated, said device comprising a light source, a reflector, an optical integrator for forming said beam cross-section and for realising a uniform light distribution across the beam cross-section, and a polarizing system for converting the source light into linearly polarized light.

The invention also relates to an image projection apparatus comprising such an illumination device.

2. Discussion of the Related Art

The term image projection apparatus should be considered to have a wide meaning and comprises an apparatus for displaying, for example a video image, a graphic image, numerical information or a combination thereof. The images may be both monochrome and color images. In the latter case the apparatus comprises an image display system having three color channels for, for example the primary colors red, green and blue, each of which accommodates an image display panel.

A device and an apparatus of this type are described in U.S. Pat. No. 5,184,248. The illumination device described in this Patent has a high efficiency, that is to say, a high percentage of the light emitted by the light source is used for illuminating the object which consists of a liquid crystalline image display panel referred to as LCD panel, in which the illumination is also satisfactorily uniform. A bright image having a uniform intensity can be projected on a projection screen by means of an image projection apparatus comprising this device. This is achieved by passing the light beam emitted by the source through an optical integrator comprising a first lens plate having a plurality of first lenses whose height-width ratio corresponds to that of the LCD panel to be illuminated and a second lens plate having a plurality of second lenses which image the light spots formed on the first lenses in a superimposed manner on the LCD panel. It is thereby achieved that the light beam cross-section at the area of the LCD panel exactly fits this panel and that the intensity distribution within this cross-section is uniform. Subsequently the beam is first split in a polarizing system by means of a polarization-sensitive beam splitter into two linearly polarized sub-beams having mutually perpendicular directions of polarization, and subsequently these sub-beams are combined again after one of the sub-beams has undergone a polarization rotation so that its direction of polarization is the same as that of the other sub-beam. Also as regards the polarization, all light from the source can thus be used for illuminating the LCD panel.

In most embodiments of the known illumination device the second lens plate must be imaged in or near the exit plane of the polarizing system, for which image a plurality of lenses is required and, moreover, a given distance between this lens plate and the polarization system is necessary.

U.S. Pat. No. 5,184,248 shows an embodiment in FIG. 31 in which the polarizing system is directly arranged behind the optical integrator and in which no lens system for imaging the second integrator plate is present on the polarizing system, so that this embodiment is shorter and comprises fewer components than the other embodiments. However, the different embodiment supplies a beam having a larger cross-section than that which is supplied by the other embodiments, so that, for example the projection lens system must have a large aperture when this embodiment is used in an image projection apparatus. Moreover, in the devices described in U.S. Pat. No. 5,184,248 the lens plates should have relatively large dimensions and therefore be arranged at a relatively large distance from each other, because the optical integrator is arranged in a beam having a relatively large cross-section.

SUMMARY OF THE INVENTION

It is an object of the present invention to provide an illumination device of the type described in the opening paragraph, which device is considerably smaller and comprises fewer optical elements than the known device, while the cross-section of the supplied beam nevertheless remains limited.

The device according to the invention is characterized in that the polarizing system is arranged in the radiation path in front of the optical integrator.

In this device, lens plates having a cross-section which is smaller than that of the exit plane of the reflector are used, so that these plates become less expensive and can be arranged closer together. To this end the beam incident on the first lens plate should be a converging beam and a given distance between the reflector and the first lens plate should be observed. By arranging the polarizing system in the space between the reflector and the first lens plate, this space is utilized to an optimum extent and for obtaining the desired polarized light, the construction length of the image projection apparatus need not be extended.

It is essential for the device according to the invention that the beam incident on the optical integrator is a converging beam. Such a beam can be obtained by giving the reflector such a shape that it has a converging effect. This reflector is, for example elliptical.

However, the device may be further characterized in that a converging lens is arranged between the light source and the polarizing system.

This lens can take over the converging action of the reflector, or it may add a converging action to that of the reflector so that the distance between the light source and the polarizing system can be reduced. If the reflector need not be converging, it can be optimized for other aspects, for example, the reflector may then be a paraboloid or a hyperboloid. Such surfaces can easily be provided with a layer having a high reflection.

The polarizing system preferably comprises the combination of a polarization-sensitive beam-splitting prism developed by the Applicant and a polarization rotator, of which combination different embodiments are described in claims 2–10. These embodiments are known per se from U.S. Pat. No. 5,184,248 in which also the operation and advantages of these embodiments have been described. These advantages are maintained when said combination is used in the novel illumination device according to the invention.

The optical integrator in this device may be constituted by a light guiding tube in which the light propagates via reflections on the inner wall and whose entrance face is adapted to the cross-section of the beam emerging from the polarizing system, while the exit face of the light guiding tube, which can be arranged close to the object to be illuminated, is adapted in shape and dimensions to the object to be illuminated.

However, the optical integrator preferably comprises a first and a second lens plate having the constructions and functions as described in claim 11. Different embodiments of such an integrator are described in claims 12–16. These embodiments are known per se from U.S. Pat. No. 5,184,248 which also describes the operation and advantages of these embodiments. These advantages are maintained when said integrator is used in the novel illumination device according to the invention.

The invention also relates to an image projection apparatus comprising an illumination device, an image display system for generating an image to be projected and provided with at least one image display panel, and a projection lens system for projecting the image formed by the image display system on a projection screen. This apparatus is characterized in that the illumination device is implemented as described hereinbefore.

A preferred embodiment of this apparatus for projecting color images is further characterized in that the image display system comprises color-selective beam splitters for splitting the beam into three differently colored sub-beams and a separate image display panel for each sub-beam, as well as beam-recombining means for combining the sub-beams coming from the image display panels to one color beam.

An alternative embodiment of the color image projection apparatus is provided with three color channels each comprising an illumination device according to the invention.

BRIEF DESCRIPTION OF THE DRAWINGS

These and other aspects of the invention will now be apparent from and elucidated with reference to the embodiments described hereinafter.

In the drawings

DETAILED DESCRIPTION OF THE PREFERRED EMBODIMENTS

Figure 1:
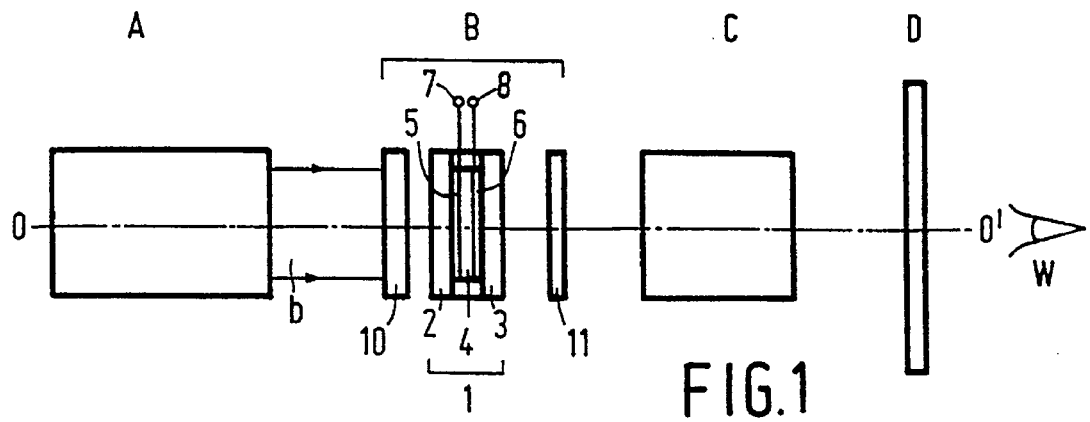
FIG. 1 shows the diagram of an image projection device.

In FIG. 1, the block A represents an illumination device which emits a light beam b whose principal axis coincides with the optical axis OO' of the image projection apparatus. This beam is incident on the image display system B which has one image display panel 1 if a monochromatic image must be projected. This panel is, for example a liquid crystal display panel (or LCD panel). Such a panel comprises a layer of liquid crystalline material 4, for example of the nematic type which is enclosed between two transparent, for example glass plates 2 and 3. Drive electrodes 5 and 6 are arranged on each of these plates. These electrodes may be divided into a large number of rows and columns defining a large number of pixels in the image display panel. The different pixels are then driven by driving the matrix electrodes, as is diagrammatically shown by means of the drive terminals 7 and 8. An electric field can thus be applied across the liquid crystalline material 4 at the desired positions. Such an electric field causes a change of the effective refractive index of the material 4 so that the light which passes through a given pixel is subjected or not subjected to a rotation of the direction of polarization, dependent on the absence or presence of a local electric field at the location of the relevant pixel.

Instead of this passive-drive image display panel, an active-drive panel may be used. In the latter image display panel one of the supporting plates comprises an electrode while the other plate is provided with the semiconductor drive electronics. Each pixel is now driven by its own active drive element such as, for example a thin-film transistor. Both types of direct-drive image display panels are described in, for example European Patent Application no. 0 266 184.

The beam incident on the image display panel 1 should be polarized, preferably linearly polarized. However, the illumination system A supplies unpolarized light. It is common practice to select a linearly polarized component having the desired direction of polarization from this light by means of an absorbing polarizer 10. An analyser 11 whose direction of polarization is, for example effectively parallel to that of the polarizer 10 is arranged in the path of the light transmitted by the image display panel. Consequently, the light coming from those pixels which are energized and do not change the direction of polarization of the beam is passed to a projection lens system C by the analyser. The light coming from the non-energized pixels, which rotate the direction of polarization of the beam through 90°, is blocked by the analyser. The analyser thus converts the polarization modulation of the beam into an intensity modulation. The projection lens system C projects the image formed on the panel 1 on a projection screen D. This projected image can be observed by a viewer W who is present in the space behind the projection screen.

The image display panel may alternatively be a dispersive panel, for example a PDLC (Polymer Dispersed Liquid Crystal) panel which is preceded by a polarizer and succeeded by an analyser, as described in the article "A full-color TFT-LCD with Polymer Dispersed Structure" in Japan Display 1992, pp. 531–634.

When used in transmission, a liquid crystal image display panel has a low efficiency, for example only 30% of the radiation incident on a monochrome panel and only 10% of the radiation incident on a color panel is passed to the projection lens system. Moreover, this system images the panel in a magnified form so that the illumination beam should have a large intensity if there is to be a sufficient radiation intensity per surface unit on the screen. The use of a light source in the form of a lamp having a higher intensity only provides limited advantages. In fact, lamps having a higher light intensity also generally have a larger radiating surface in the form of a lamp are so that the exit aperture of the illumination system will be larger. If the beam aperture is reduced so as to limit the dimensions of the subsequent optical components in the projection apparatus, a portion of the light energy would be lost again. It is therefore desirable to capture and use as much light from the lamp as possible and to concentrate it in a narrow beam. A further requirement is that the cross-section of this beam is adapted as satisfactorily as possible to the rectangular shape of the image display panel so that a minimum quantity of light is incident alongside this panel.

To satisfy these requirements, a number of measures have been taken in the device described in U.S. Pat. No. 5,184,248. First, the two polarization components of the source light are used to illuminate the image display panel. To this end, use is made of a combination of a special polarization-sensitive beam splitter and a polarization converter. Secondly, it has been ensured that the light beam incident on the LCD panel has a specific cross-section.

Figure 2:
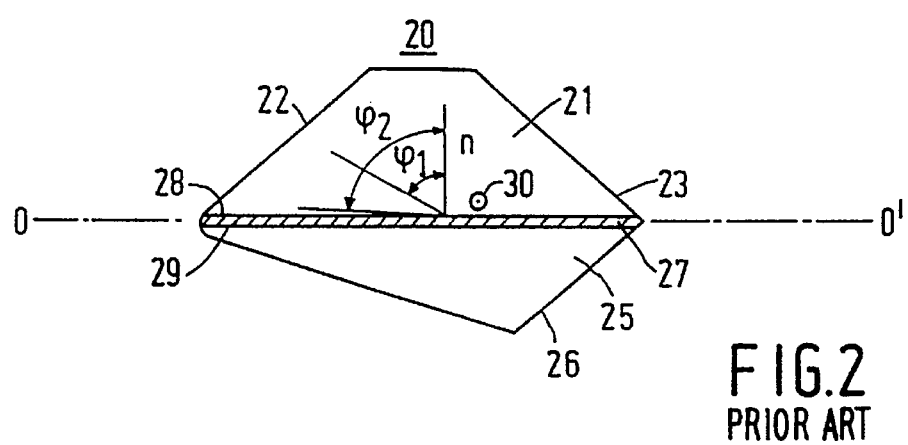
FIG. 2 shows a first embodiment of a beam splitter for use in an illumination device according to the invention.

FIG. 2 shows the polarization-sensitive beam splitter in a cross-section. This beam splitter 20 comprises two prisms 21 and 25 of, for example glass and a birefringent layer 27. This layer consists of, for example a liquid crystalline material. The ordinary refractive index $n_o$ is substantially always equal to 1.5, while the extraordinary refractive index $n_e$ may have a value of between 1.6 and 1.8, dependent on the composition of the layer 27. Orientation layers 28 and 29 ensuring that the optical axis of the layer 27 is perpendicular to the plane of the drawing in this case are provided on the prisms. This axis is denoted by the reference numeral 30 in FIG. 2. It has been ensured that the refractive index $n_1$ of the prism material is equal to $n_e$ of the layer 27, for example 1.7. If an unpolarized light beam is incident via the prism 21 on the layer 27 at an angle of incidence φ which is larger than or equal to the critical angle, the P-polarized component of this beam is totally reflected towards the exit face 23 of the prism 21 because the ordinary refractive index of the layer 27 holds for this component, which refractive index is smaller than that of the prism 21. The P-polarized component is the component whose direction of polarization is parallel to the plane of incidence, i.e. the plane through the normal n on the layer 27 and the chief ray of the incident beam, hence the plane of the drawing in FIG. 2. For the S-polarized component, whose direction of polarization is transverse to the plane of incidence, the extraordinary refractive index of the layer 27 holds so that this component does not have any refractive index difference upon passage through the beam splitter and successively traverses the prism 21, the layer 27 and the prism 25 in the original direction.

The critical angle $φ_1$ for the P-component is given by sin $γ_1=n_o/n_1$ or: $γ_1=\arcsin n_o/n_1$. so that it should hold for the angle of incidence φ that: $φ>\arcsin n_o/n_1$, if the P-component is to be reflected completely. Also if the extraordinary refractive index $n_e$ of the layer 27 is not equal to $n_1$ of the prism material, the S-component is completely passed as long as the angle of incidence φ is smaller than the critical angle $φ_2$ for which it holds that: sin $γ_2=n_e/n_1$ or $γ_2$ arcsin $n_e/n_1$. The full condition for the angle of incidence φ for obtaining the division by the layer 27 thus is:

$(γ_1=)$ arcsin $n_o/n_1<γ<$arcsin $n_e/n_1(=γ_2)$.

The angles $φ_1$ and $φ_2$ are shown in FIG. 2.

The refractive index difference $Δn=n_e-n_o$ of liquid crystalline material may be large so that the beam splitter 20 is suitable for a large area $(φ_2-φ_1)$ of angles of incidence φ. Moreover, it can be ensured that the refractive index of the prism material and that of the layer 27 vary in the same manner at a variation of the wavelength of the incident light beam so that the beam splitter has a large polarization-separating efficiency for a large wavelength range. A very great advantage of the beam splitter of FIG. 2 is that it is inexpensive because no expensive birefringent prism materials are necessary, as in a Wollaston prism, and that this prism can be produced in a relatively simple manner.

The prisms 21 and 25 need not be solid; these prisms may alternatively have glass or other transparent walls within which a transparent liquid or synthetic material having a high refractive index equal to $n_e$ of the layer 27 is provided. These walls should then have the same refractive index as the liquid or synthetic material, which materials should not have any depolarizing effects.

Instead of a liquid crystalline layer, a birefringent adhesive layer is preferably used as a polarization-separating layer in the beam splitter of FIG. 2. As compared with a beam splitter having a liquid crystalline layer, a beam splitter having a birefringent adhesive layer has the advantages of an easier construction and less temperature dependence, better resistance to higher temperatures and more possibilities of matching the refractive index of the layer and those of the prisms.

The birefringent adhesive layer is preferably a uniaxially oriented polymer layer. The desired orientation can be obtained, for example by rubbing the prism surfaces between which the layer must be provided in one direction, whereby it is practical if a layer of polyimide is provided on the surfaces to be rubbed.

A very temperature-resistant beam splitter is the beam splitter in which the polymer layer has a cured liquid crystalline monomer composition.

Figure 3:
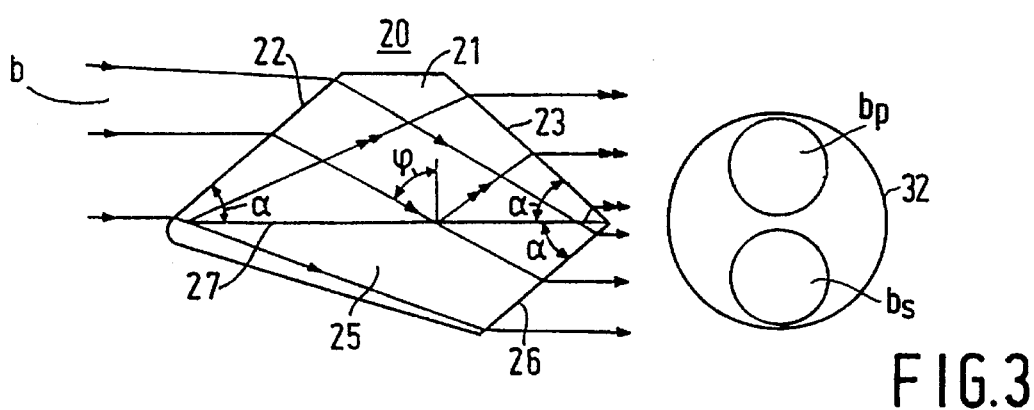
FIG. 3 shows the operation of this beam splitter.

FIG. 3 shows how an illumination beam b incident on the beam splitter 20 is split by this beam splitter into two linearly, mutually perpendicularly polarized beam components $b_p$ and $b_s$. Only the chief ray and the two border rays of the illumination beam b, which rays enter the prism 21 through the face 22 are shown. This face is at an angle α to the separating layer 27 so that, after refraction by this face, the angle of incidence φ of the beam on the layer 27 has a value between the above-mentioned critical angles $φ_1$ and $φ_2$ so that the P-polarized beam component $b_p$ is completely reflected and leaves the prism 21 via the exit face 23. The S-polarized component enters the prism 25 and leaves this prism via the exit face 26. The exit faces 23 and 26 are also placed at an angle α to the separating layer 27 so that the beam components $b_p$ and $b_s$ have effectively traversed a plane-parallel plate and thus, after refraction at the faces 23, 26, are parallel to the incident beam b.

The beam b is located at one side of the layer 27. The emerging beam components $b_p$ and $b_s$ have a round cross-section and are located at different sides of the principal axis within a circle 32, as is shown in the right-hand part of FIG. 3.

Figure 4:
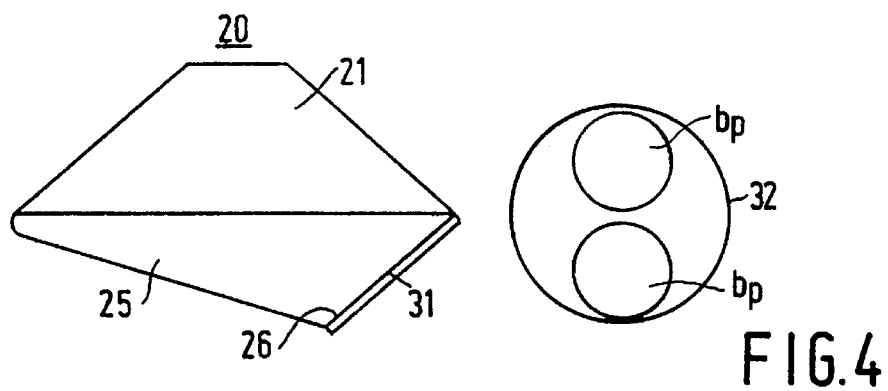
FIG. 4 shows this beam splitter with a polarization rotator on one of the exit faces.

If, as shown in FIG. 4, a λ/2 plate 31 is arranged on one of the exit faces, for example the face 26, the direction of polarization of the component $b_s$ is rotated through 90° so that the beam emerging from the plate 31 is also P-polarized. Linearly polarized light which is completely suitable for illuminating the panel 1 of FIG. 1 emerges from the polarizing system constituted by the beam splitter 20 and the polarization rotator 31.

Instead of a λ/2 plate, a layer of rotated liquid crystalline material, for example a polymer or a plurality of uniaxial birefringent layers which are mutually rotated can be used as a polarization rotator 31. The polarization rotator may not only be provided on an exit face 23 or 26, but also behind such an exit face.

Figure 5:
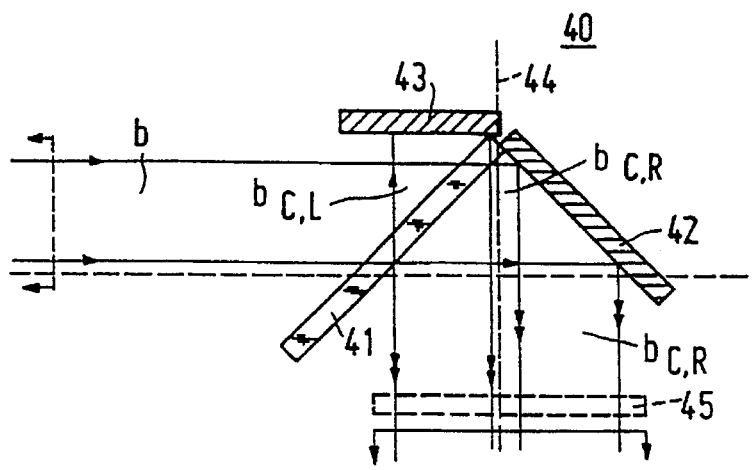
FIG. 5 shows a second embodiment of a beam splitter.
Figure 5:
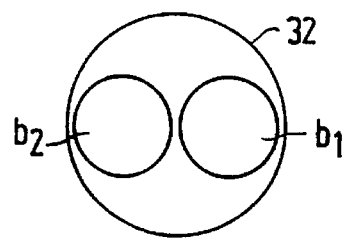

FIG. 5 shows a second embodiment of a beam splitter. The polarization-sensitive separating layer 41 of this beam splitter 40 comprises a cholesteric liquid crystalline material. This material may be of the laevorotatory or dextrorotatory type. If the material is of the laevorotatory type, the component which is levocircularly polarized, $b_{c,L}$, of the entering unpolarized beam b is reflected, while the dextrocircularly polarized component $b_{c,R}$ is passed. The component $b_{c,R}$ is reflected by a special reflector 42 to the image display system (not shown). This reflector does not change the state of polarization of the component $b_{c,R}$ and comprises, for example a dextrorotatory liquid crystalline material. The reflected component $b_{c,L}$ is incident on a normal reflector 43, for example a metal mirror which converts the levocircularly polarized light into dextrocircularly polarized light which is passed by the layer 41 and has the same direction as the component $b_{c,R}$. The beam b is thus converted into two beam components $b_1$ and $b_2$, both with dextrocircularly polarized light, and is located within a circle 32, as is shown in the lower part of FIG. 5.

The beam with dextrocircularly polarized light can be applied to an image display panel without polarization conversion. This has the advantage that the field with which the panel, for example of the nematic type, is to be driven is smaller than in the case where linearly polarized radiation is used. Alternatively, a λ/4 plate 45 may be arranged in a diagonal position behind the beam splitter 40, which plate converts the circularly polarized light into linearly polarized light.

Instead of a laevorotatory cholesteric layer, a dextrorotatory cholesteric layer may be used as a separating layer 41 in which the reflector 42 may then consist of laevorotatory material and the reflector 43 may be a normal mirror again. Then the light emerging from the beam splitter 40 is levocircularly polarized.

Figure 6:
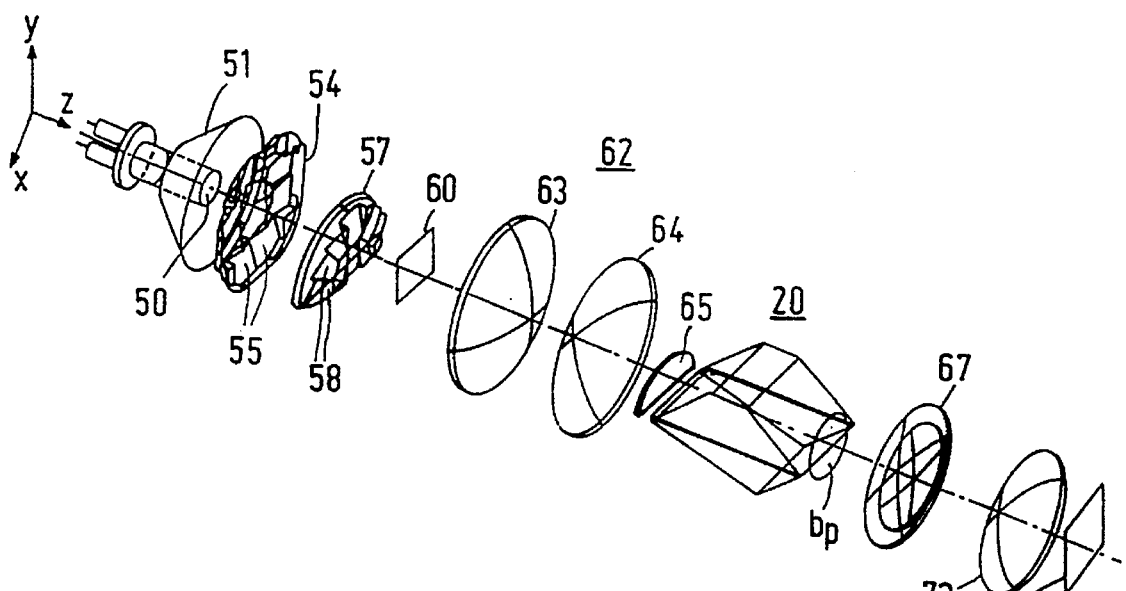
FIG. 6 shows a known illumination device in a perspective view.

FIG. 6 shows the illumination device in accordance with U.S. Pat. No. 5,184,248 in a perspective view, which device is provided with an optical integrator and a polarizing system. The device further comprises a lamp 50 which emits light both in the direction of the image display panel and in the backward direction (at the left in FIG. 6). A reflector 51 is arranged at the rear side of the lamp, which reflector reflects the light emitted by the lamp to an optical integrator in the form of a first lens plate 54 and a second lens plate 57 spaced apart therefrom. The lenses 55 of the lens plate 54 divide the incident beam into a number of sub-beams corresponding to the number of lenses and ensure that these sub-beams have their beam waist in the plane of the lenses 58 of the second lens plate 57. The number of lenses 55 is equal to the number of lenses 58. Each of the lenses 55 thus images the source on an associated lens 58. The lenses 58 have such a power in such a direction that they range the radiation spots formed on the lens plate 54 in a superimposed manner in an intermediate image 60. It is thereby achieved that the illumination beam has a satisfactory uniform distribution in situ, which distribution will be maintained further down the device. At the area of the lens plate 57 a source image having a semicircular cross-section is produced. The intermediate image 60 is an image of the lenses 55 and thus has a shape which corresponds to that of these lenses.

A lens system 62 comprising, for example two planoconvex lenses 63 and 64 is arranged behind the intermediate image 60. This lens system images the intermediate image 60 at infinity, while it forms an image 65 of the lens plate 57 at the location of the prism 20 of the polarizing system.

The lens plate 57 and hence its image 65 is preferably semicircular so that the prism is filled optimally. A further lens 67 is arranged behind the polarization-sensitive beam splitter 20. An image 70 of the intermediate image 60, hence a superimposed final image of the lenses 55 is produced in its focal plane. The image display panel 1 is placed in this final image.

Figure 7:
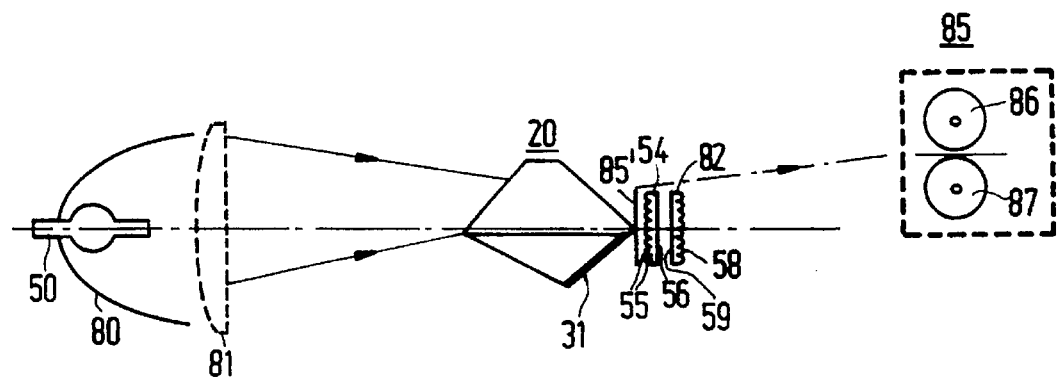
FIG. 7 shows an embodiment of the illumination device according to the invention in a cross-sectional view.
Figure 8:
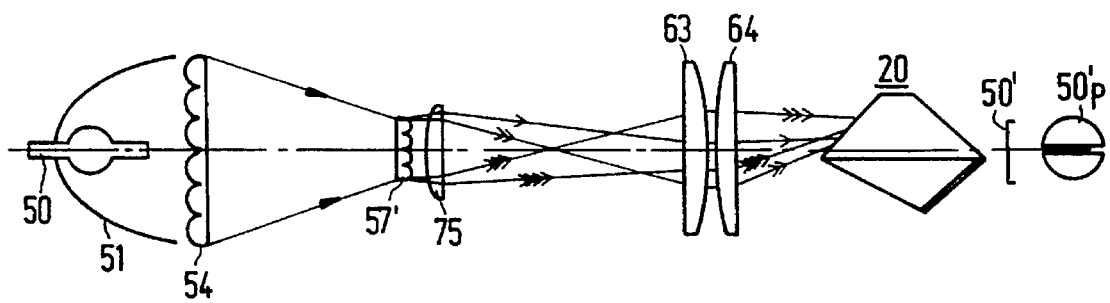
FIG. 8 shows the known illumination device in a cross-sectional view.

In accordance with the present invention the length of the known device, as well as the diameter of the lens plates 54, 57 can be considerably reduced by arranging the polarizing system 20, 31 of FIG. 3 between the radiation source unit 50, 51 and the integrator 54, 57. FIG. 7 shows a cross-section of the novel illumination device. For the purpose of comparison, FIG. 8 shows a cross-section of the known device. In the device of FIG. 8 the semicircular lens plate 57 of FIG. 6 is replaced by a circular lens plate 57'. The construction length can be slightly shortened by means of an extra lens 75. A circular lens image $50_p$ consisting of two halves and being formed with, for example p-polarized light is produced again behind the prism 20.

The illumination device according to the invention (FIG. 7) again comprises a lamp 50, a reflector 80, a polarizing system 20, 31 and an optical integrator consisting of two lens plates 54, 82. The polarizing system has the same construction and operation as described with reference to FIGS. 2, 3 and 4. Now, instead of one beam having a round cross-section, two sub-beams 86 and 87 each having an intensity decreasing from their centres to the edge are produced behind the polarizing system. This is shown in the inset 85 of FIG. 7. The radiation spots 86 and 87 shown in this inset are actually slightly put together. Since the beam 85 still traverses the integrator 54, 82, the intensity distributions are equalized so that the beam emerging from the integrator and incident on the image display panel has a uniform intensity. This is a further advantage of the device according to the invention as compared with that of FIG. 8 in which each half of the image $50'_p$ consists of a plurality of sub-spots having an intensity decreasing from their centres to the edges. Referring again to FIG. 7 the reflector 80 may be an elliptical reflector in which the lamp 50 is at or close to the first focus of this reflector while the first lens plate 54 is arranged in or in the vicinity of the second focus because the beam cross-section is smallest at that location. Alternatively, a reflector having a different shape, for example a parabolic reflector may be used, which reflector forms a substantially parallel beam of the lamp light. The reflecting surface of a parabolic reflector is less parallel to the optical axis than that of the elliptic reflector, which simplifies the provision of a layer having a high reflection on this surface. When a parabolic reflector is used, a lens 81 must be arranged behind the reflector so as to converge the lamp light on the first lens plate. It is alternatively possible to place a lens behind the reflector which already converges of itself so as to obtain extra convergence of the beam. The reflector may alternatively be a hyperbolic reflector or a combination of said reflectors.

Figure 9:
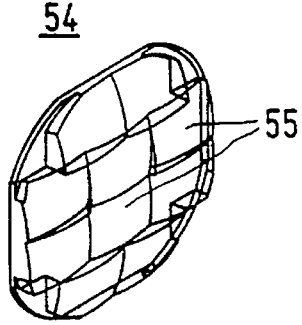
FIGS. 9 and 10 are perspective front and rear views, respectively of the first lens plate of the optical integrator.
Figure 10:
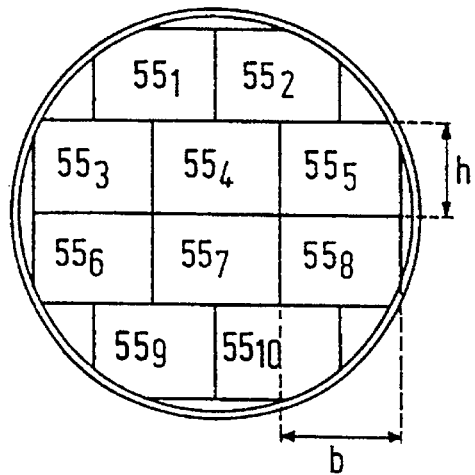

The side of the first lens plate 54 facing the source is provided with a plurality of lenses 55 and the other side 56 is preferably plane. FIG. 9 shows this plate in a perspective front view, while FIG. 10 shows the plate in a rear view. The plate 54 comprises, for example 10 lenses. Each of these lenses images the source 50 on an associated lens 58 of the second lens plate 82. The source-facing side 59 of this plate, which principally has the same shape as the first lens plate 54, is plane, whereas the side remote from the source supports a plurality of lenses 58. The number of lenses 58 of the plate 82 is equal to or, for example, if the reflector 80 forms a lamp image next to the lamp, twice the number of lenses 55 of the plate 54. For imaging the light source 50 on the corresponding lenses $58_1 \ldots 58_{10}$ by means of the different lenses $55_1, \ldots, 55_{10}$, each time a different portion of the beam incident on the lens plate 54 is used. The lenses $55_1 \ldots 55_{10}$ have such a power in such a direction that the sub-beams passing through them have their beam waist in the plane of the lenses 58, while their chief ray is directed towards the centre of an associated lens 58. The lenses 58 have such a power in such a direction that they image the radiation spots formed on the lenses 55 in a superimposed manner on the object to be illuminated, for example an LCD panel, or in an intermediate image which is conjugated with this object. It is thereby achieved that the beam at the location of the object or the intermediate image has a satisfactory uniform intensity distribution.

The cross-section of the beam at those positions is then adapted to that of the object to be illuminated. The liquid crystal display panels which are used for displaying conventional video images have an aspect ratio b:h=4:3, in which the width b is the dimension in the X direction, of FIG. 6, and the height h is the dimension in the Y direction. In the embodiment shown in FIGS. 9 and 10, the lenses 55 of the plate 54 have the same aspect ratio. It is thereby achieved that all radiation from the radiation source unit 50, 80 passes through the image display panel and that the illumination system has a high collection efficiency.

The image display panel and the lenses 55 may alternatively have a different aspect ratio, for example 16:9.

Similarly as in the known device, at least one of the lenses of at least one of the lens plates may be aspherical in the novel illumination device.

An aspherical lens is understood to mean a lens whose fundamental shape is spherical but whose real shape deviates to a slight extent therefrom so as to correct for spherical aberrations of the fundamental shape. The system efficiency can be improved by using aspherical lenses in a lens plate.

The first lenses are further preferably arranged in such a way and have such a size that the surface of the first lens plate is approximately equal to the cross-section of the illumination beam incident thereon.

Then, a maximum quantity of the light emitted by the source and collected by the reflector is received.

The diameter of the first lens plate may be different from that of the second lens plate. If the illumination device is, however, implemented in such a way that these diameters are equal, likewise as the shape and dimensions of the first and second lenses, only one type of lens plate is to be used so that the device may be made at a lower cost and its assembly can be simplified.

The shape and dimensions of the lenses of the second lens plate may be chosen to be such that they exactly fit the beam cross-sections, in the plane of the second lenses, of the sub-beams constituted by the first lens plate so that the efficiency of the illumination device is enhanced.

The lenses of the first and second lens plates may not only be provided on the sides of the relevant plate facing and remote from the light source, but also on the sides of the relevant plate remote from and facing the light source, respectively.

When a lens plate is preceded or succeeded by a lens, this lens and the plate may be integrated in one element as is shown in FIGS. 17 and 18 of U.S. Pat. No. 5,184,248 and as described in this Patent.

Moreover, as is shown in FIG. 19 of U.S. Pat. No. 5,184,248, the lens-supporting surface of the first lens plate may be curved so as to achieve that the intensity of the illumination beam on the image display panel is smaller at the edge of the beam than in the middle so as to obtain a more natural image on the projection screen, as has been described in U.S. Pat. No. 5,184,248.

Since in the device according to the invention the second lens plate 57 is no longer imaged behind or in front of the prism 20, the number of components in and the length of this device is smaller than in the known device. Since, moreover, the beam incident on the optical integrator has a smaller cross-section than in the known device, the integrator plates are smaller and these plates can be arranged closer together so that the build-in length is reduced.

Figure 11:
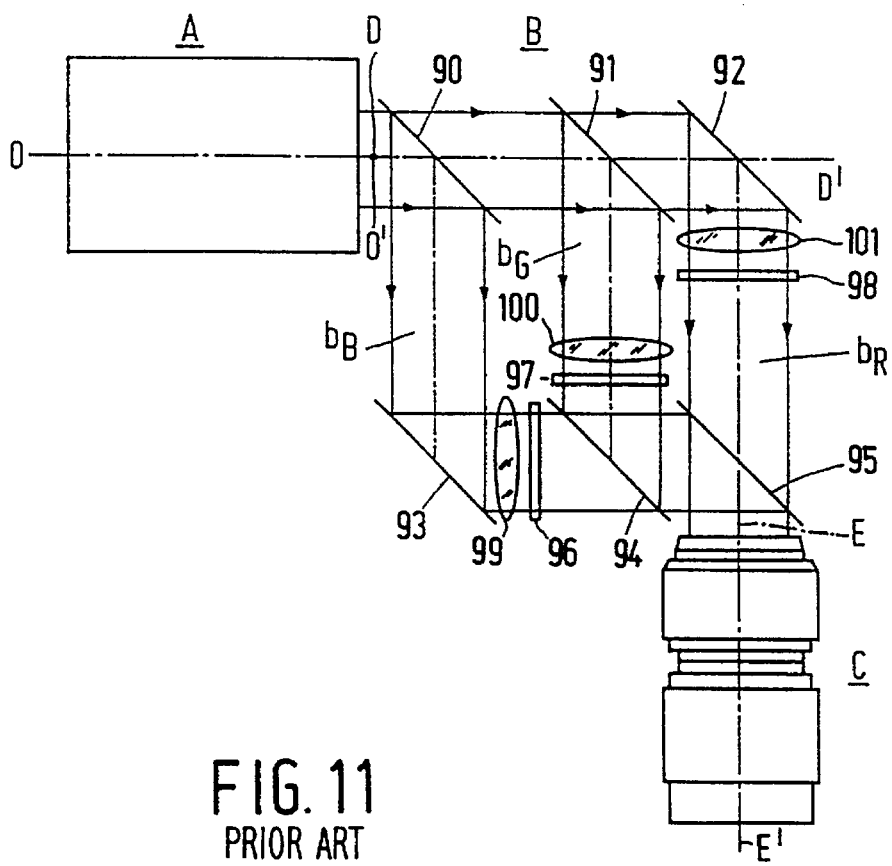
FIG. 11 shows an embodiment of a color image projection apparatus comprising one illumination device and transmissive image display panels.

FIG. 11 shows an embodiment of a color projection television apparatus in which the illumination device according to the invention can be used to great advantage.

This apparatus comprises three main sections: the illumination system A, the image display system B and the projection lens system C, for example a zoom lens. The principal axis OO' of the illumination system is in alignment with the optical axis DD' of the apparatus which in the embodiment shown is first divided into three sub-axes, which sub-axes are later combined to one optical axis coinciding with the optical axis EE' of the projection lens system.

The beam from the illumination system A is incident on a color-selective reflector 90, for example a dichroic mirror which reflects, for example the blue color component $b_B$ and passes the rest of the beam. This beam portion reaches a second color-selective reflector 91 which reflects the green color component $b_G$ and passes the remaining red color component $b_R$ to a reflector 92 which reflects the red beam to the projection lens system. The reflector 92 may be a neutral reflector or a reflector which is optimized for red light. The blue beam is reflected by a neutral or blue-selective reflector 93 to a display panel 96 in the form of a liquid crystalline panel. This panel is electronically driven in known manner so that the blue component of the image to be projected appears on this panel. The beam modulated with the blue information reaches the projection lens system C via a color-selective reflector 94, which passes the blue beam and reflects the green beam, and a further color-selective reflector 95 which reflects the blue beam. The green beam $b_G$ traverses a second display panel 97 where it is modulated with the green image component and is then successively reflected to the projection lens system C by the color-selective reflectors 94 and 95. The red beam traverses a third display panel 98 where it is modulated with the red image component and subsequently reaches the projection lens system via the color-selective reflector 95.

The blue, red and green beams are superimposed at the input of this lens system so that a color image is produced at this input which is imaged in a magnified form by this system on a projection screen not shown in FIG. 11.

The optical path lengths between the output of the illumination system A and each of the display panels 96, 97 and 98 are preferably equal so that the cross-sections of the beams $b_B$, $b_G$ and $b_R$ are equal at the location of their display panel. The optical path lengths between the display panels 96, 97 and 98 and the entrance pupil of the projection lens system are also preferably equal so that the differently colored scenes are satisfactorily superimposed on the projection screen.

Each of the lenses 99, 100 and 101 arranged in front of the image display panels 96, 98 and 98 corresponds to the lens 73 in FIG. 6 and ensures that all radiation coming from the exit face of the illumination system is concentrated in the entrance pupil of the projection lens system C.

Figure 12:
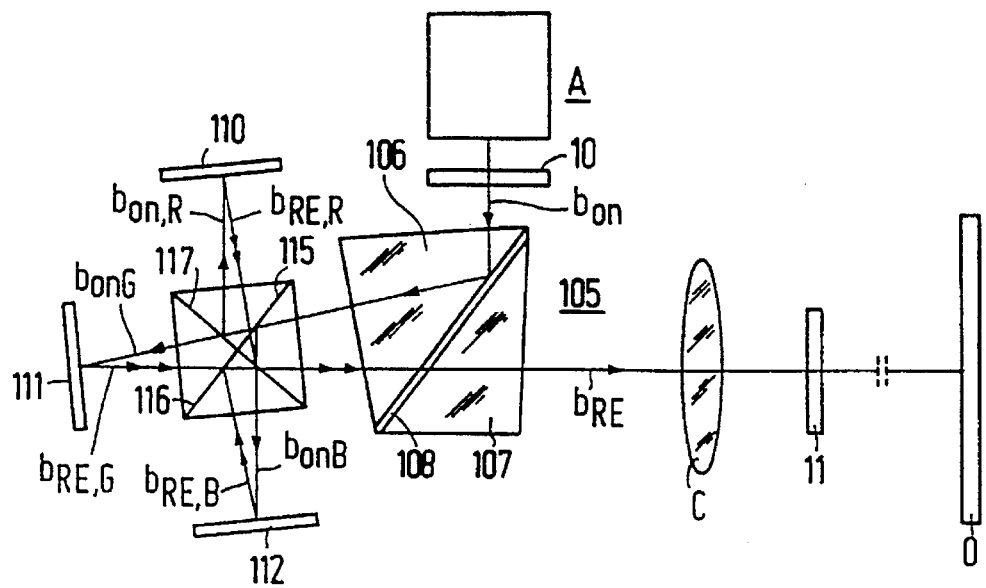
FIG. 12 shows an embodiment of a color image projection apparatus comprising one illumination device and reflective image display panels.

FIG. 12 shows an embodiment of a color image projection apparatus with reflecting image display panels 110, 111 and 112. The beam b supplied by the illumination system according to the invention is split into three differently colored beams $b_R$, $b_G$ and $b_B$ by a dichroic cross 115 constituted by two dichroic mirrors 116 and 117.

The projection lens system C, shown by means of a single lens in this Figure, can only receive radiation of the beam bRE reflected by the image display panels and no radiation of the beam bON supplied by the illumination system.

In order to realise that the beams bON and bRE are sufficiently separated at the area of the projection lens system without the distance between this system and the image display panel having to be large, use is made of an angle-dependent beam separator in the form of a composite prism system 105. This system comprises two transparent prisms 106 and 107 of glass or synthetic material enclosing an air layer 108. Since the refractive index $n_m$ of the prism material ($n_m$ is, for example 1.5) is larger than the refractive index, $n_1$, of air ($n_1$=1.0), a radiation beam incident on the interface between the prism and air at an angle $\Theta_i$ which is larger than or equal to the critical angle $\Theta_g$ for which it holds that $$\sin \Theta_g = n_1/n_m$$

will be totally reflected. Upon incidence on the interface at an angle smaller than the critical angle, the beam is completely passed. In the embodiment of FIG. 12 the refractive index of the prisms 106 and 107 and the orientation of the air layer 108 are chosen to be such that the beam $b_{ON}$ coming from the illumination system A is totally reflected by the interface 106, 108 towards the display system and the beam $b_{RE}$ coming from this system is completely passed by this interface. The angle of incidence of the beam $b_{ON}$ and the beam $b_{RE}$ on the interface is to this end larger or smaller, respectively, than the critical angle.

The prism system causes the chief ray of the beam $b_{RE}$ to extend at a large angle, which may be proximate to 90°, to that of the beam $b_{ON}$. Consequently, the projection lens system C can be placed close to the display system so that the length of the image projection device may be considerably smaller than in the absence of the prism system.

It is alternatively possible to choose the orientation of the interface 106, 108 with respect to the directions of the beams $b_{ON}$ and $b_{RE}$ in such a way that the beam $b_{ON}$ is passed to the display system, which is then present under the prism system, and the beam $b_{RE}$ is reflected towards the projection lens system C. When color beam projection is used, the latter set-up provides the advantage that fewer color aberrations occur in the modulated beam $b_{RE}$.

In FIG. 12 the beam $b_{ON}$ reflected by the interface 106, 108 is incident on a first dichroic mirror 116 which reflects, for example blue light. The blue component $b_{ON,B}$ is incident on the display panel 112 in which the blue sub-image is generated and the beam $b_{RE,B}$ modulated with the blue image information is reflected by the panel 112 to the dichroic cross 115. The beam with the red and the green component passed by the dichroic mirror 116 is incident on the second dichroic mirror 117 which reflects the red component $b_{ON,R}$ to the display panel 110. The red sub-image is generated in this panel. The beam $b_{RE,R}$ modulated with the red image information is reflected to the dichroic cross 115. The green beam component $b_{ON,G}$ passed by the mirror 117 is modulated by the green image display panel 111 and reflected as beam component $b_{RE,G}$ to the dichroic cross 115. Since the dichroic mirrors 116 and 117 reflect the returning beam components $b_{RE,B}$ and $b_{RE,R}$ and pass the beam component $b_{RE,G}$, these beam components are combined in one beam $b_{RE}$ which is modulated with the color image information.

The polarizer 10 and the analyser 11 are preferably arranged between the illumination system A and the image display system and between the image display system and the projection lens system, respectively, so that these elements simultaneously act on the three color components and a separate system of such elements need not be used for each color component.

A directly driven reflective liquid crystal image display panel is described in inter alia U.S. Pat. No. 4,239,346.

In the color image projection apparatus a polarization-sensitive beam splitter may be used instead of the composite prism 105, so that the beams can be perpendicularly incident on the image display panels. The polarization-sensitive beam splitter ensures that only light having a given direction of polarization is reflected or passed to a display panel, and that of the light reflected by the panel only the component having a direction of polarization which is perpendicular to the direction of polarization of the incident beam is passed or reflected to the projection lens system. The polarization-sensitive beam splitter also functions as a converter from polarization modulation to intensity modulation.

Instead of an image display system having three monochrome panels, the color image projection apparatus may alternatively be provided with an image display system having only one image display panel, viz. a composite or color panel. This color panel then comprises a number of pixels which is, for example three times as large as the number of pixels of a monochrome panel. The pixels of the color panel are arranged in accordance with three groups with which a red, a green and a blue sub-picture, respectively, is generated. A pixel of each of the groups is each time associated with a pixel on the projection screen. For example, a separate color filter is then placed in front of each pixel, which color filter passes the desired color only for the relevant pixel.

The color panel may be a transmissive panel in which the color image projection apparatus is then constructed, for example as shown in FIG. 6. If the color panel is a reflective panel, the color image projection apparatus may be constructed, for example as shown in FIG. 12, in which the color panel is placed at the position of the monochrome panel 111, while the panels 110 and 112 as well as the dichroic cross 115 have been omitted.

Figure 13:
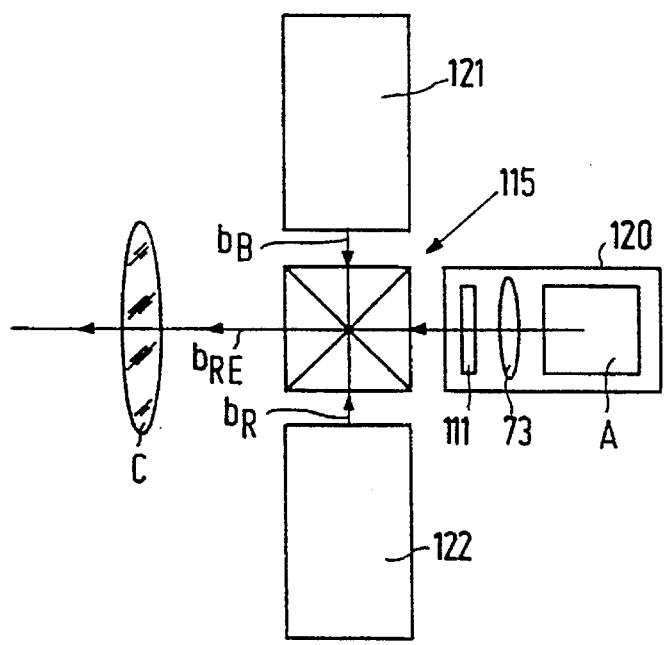
FIG. 13 shows a color image projection apparatus comprising separate illumination devices for each color channel.

FIG. 13 shows in a diagrammatic plan view a color image projection device having three color channels 120, 121 and 122 for the primary colors green, blue and red, respectively. Each of these color channels comprises an illumination system A according to the invention, a lens 73 and a transmissive image display panel 111. These elements are shown in the green channel 120. For the other channels corresponding elements are arranged in the same way. The differently colored beams $b_G$, $b_B$ and $b_R$ modulated with the image information are combined to one beam $b_{RE}$ by, for example a dichroic cross 115, which beam is projected by the projection lens system C on a display screen (not shown).

The illumination system according to the invention may not only be used for illuminating a liquid crystal image display panel, but also for illuminating an image display system in which use is made of a cathode ray tube in combination with a photoconducting layer and a layer of liquid crystalline material, which image display system is described in U.S. Pat. No. 4,127,322.

The invention may generally be used in those cases where a non-round object is to be illuminated with light having a given state of polarization and where very efficient use must be made of the radiation supplied by a radiation source.

I claim:

1. An illumination device for supplying a beam of linearly polarized light having a non-rotationally symmertrical beam cross-section at a location of an object to be illuminated, said device comprising:

a light source;

a reflector;

an optical integrator for forming the beam cross-section and for realising a uniform light distribution across the beam cross-section; and a polarizing system for converting light supplied by said light source into linearly polarized light, wherein said polarizing system is arranged in a radiation path between said light source and said optical integrator.

2. The illumination device as claimed in claim 1, wherein a converging lens is arranged between said light source and said polarizing system.

3. The illumination device as claimed in claim 1, wherein said polarizing system comprises a polarization-sensitive beam splitter for splitting a beam into two differently polarized sub-beams, the first sub-beam of which is directly suitable to be modulated by the image display system, and a polarization-rotating element for converting the second sub-beam into a beam having the same state of polarization as the first sub-beam, wherein said polarization-sensitive beam splitter comprises an oriented layer of birefringent material, and wherein the sub-beams traverse the same path length through the beam splitter, and further wherein the sub-beams emerging from the assembly of beam splitter and polarization-rotating element jointly form a beam having a round cross-section.

4. The illumination device as claimed in claim 3, wherein said beam splitter comprises a first prism having a first face parallel to a chief ray of an illumination beam incident on the beam splitter, and a second prism having a first face parallel to the chief ray, which prisms have the same refractive index, wherein the layer of birefringent material is located between the first faces of the prisms, while one of the refractive indices of the layer of birefringent material is approximately equal to that of the prisms, further wherein a second and a third face of the first prism, which faces extend at an equally large but opposite angle to the first face constitute an entrance face and a first exit face, respectively, of the beam splitter, and further wherein a second face of the second prism, which face is parallel to the second face of the first prism, constitutes a second exit face of the beam splitter.

5. The illumination device as claimed in claim 4, wherein the polarization-rotating element is arranged on one of the exit faces of the beam splitter.

6. The illumination device as claimed in claim 4, wherein the layer of birefringent material is a liquid crystalline material.

7. The illumination device as claimed in claim 4, wherein the layer of birefringent material is a birefringent adhesive layer.

8. The illumination device as claimed in claim 7, wherein the adhesive layer is a uniaxially oriented polymer layer.

9. The illumination device as claimed in claim 8, wherein the polymer layer is formed from a cured liquid crystalline monomer composition.

10. The illumination device as claimed in claim 1, wherein the beam splitter has a layer of cholesteric material placed at an angle of approximately 45° to a principal axis of the beam splitter, which layer splits an illumination beam into a first, reflected sub-beam of circularly polarized light having a first direction of rotation and a second, on-going sub-beam of circularly polarized light having a second, opposite direction of rotation and is further provided with a first reflector arranged in a path of the first sub-beam, which reflector is parallel to the principal axis, and a second reflector which is arranged in a path of the second sub-beam at an angle of approximately 90° to the cholesteric layer, and wherein one of the reflectors reverses the direction of rotation of the sub-beam incident thereon.

11. The illumination device as claimed in claim 1, wherein said optical integrator successively comprises a first lens plate provided with a plurality of first lenses which, in a plane perpendicular to a principal axis of a beam emerging from said polarizing system, have a uniform width in a first direction and a uniform height in a second direction perpendicular to the first direction, and a second lens plate provided with a plurality of second lenses, the number of which is proportional to the number of first lenses, the first lens plate dividing a light beam incident thereon into a number of sub-beams proportional to the number of second lenses, which sub-beams have their beam waist in a plane of the second lenses and whose chief rays are directed to the centres of the second lenses, the second lenses imaging radiation spots formed on the first lens plate in a superimposed manner on an object plane to be illuminated, and wherein an aspect ratio of the first lenses corresponds to that of the object plane.

12. The illumination device as claimed in claim 11, wherein at least one of the lenses of at least one of the lens plates is aspherical.

13. The illumination device as claimed in claim 11, wherein the number of first lenses is equal to the number of second lenses.

14. The illumination device as claimed in claim 11, wherein the first lenses have such a size and are arranged in such a way that a surface area of the first lens plate is approximately equal to the cross-section of the beam incident thereon.

15. The illumination device as claimed in claim 11, wherein the first lens plate is arranged in a plane in which a first image of the light source is formed and wherein the first image is re-imaged by the second lens plate on an object plane to be illuminated.

16. The illumination device as claimed in claim 11, wherein a demagnified image of the light source is formed on each of the second lenses.

17. An image projection apparatus comprising an illumination device, an image display system for generating an image to be projected and provided with at least one image display panel, and a projection lens system for projecting the image formed by the image display system on a projection screen, wherein said illumination device is a device as claimed in claim 1.

18. The image projection apparatus as claimed in claim 17 for projecting color images, wherein said image display system comprises color-selective beam splitters for splitting the beam into three differently colored sub-beams and a separate image display panel for each sub-beam, as well as beam-recombining means for combining the sub-beams coming from the image display panels to one color beam.

19. A color image projection apparatus provided with three color channels each comprising an illumination device and an image display panel, a beam-recombining system for combining the beams coming from the color channels to one color beam, and a projection lens system for imaging the image display panels on a projection screen, wherein each illumination device is a device as claimed in claim 1.

* * * * *